US006982702B1

(12) United States Patent
Frame (10) Patent No.: US 6,982,702 B1
(45) Date of Patent: Jan. 3, 2006

(54) PORTABLE COMPUTER SYSTEM (75) Inventor: Robert C. Frame, Westboro, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1098 days.

(21) Appl. No.: 09/096,684

(22) Filed: Jun. 12, 1998

(51) Int. Cl.
  *G09G 5/00* (2006.01)
(52) U.S. Cl. ................. 345/168; 345/173; 345/905; 361/680; 361/681; 248/917
(58) Field of Classification Search ............... 434/317, 434/365; 345/168–179, 901, 1.2, 156, 905; 361/680–681, 683, 686; 248/917, 918, 916; 348/12–13
See application file for complete search history.

(56) References Cited

U.S. PATENT DOCUMENTS

| 5,142,446 | A |   | 8/1992  | Tanaka et al. ............ 361/393 |
| 5,148,155 | A | * | 9/1992  | Martin et al. ............ 345/173 |
| 5,307,297 | A | * | 4/1994  | Iguchi et al. ............ 364/708.1 |
| 5,375,076 | A | * | 12/1994 | Goodrich et al. ........ 364/708.1 |
| 5,517,434 | A |   | 5/1996  | Hanson et al. ........... 364/708.1 |
| 5,522,089 | A | * | 5/1996  | Kikinis et al. |
| 5,541,398 | A |   | 7/1996  | Hanson ..................... 235/472 |
| 5,608,449 | A | * | 3/1997  | Swafford, Jr. et al. ...... 348/13 |
| 5,608,608 | A |   | 3/1997  | Flint et al. .............. 361/686 |
| 5,619,396 | A | * | 4/1997  | Gee et al. ............... 361/686 |
| 5,708,458 | A | * | 1/1998  | Vrbanac .................. 345/156 |
| 5,745,340 | A | * | 4/1998  | Landau ................... 361/681 |
| 5,781,407 | A | * | 7/1998  | Brauel .................... 361/683 |
| 5,805,415 | A | * | 9/1998  | Tran et al. ............... 361/681 |
| 5,818,425 | A | * | 10/1998 | Want et al. .............. 345/158 |
| 5,818,830 | A | * | 10/1998 | Daane et al. ............. 370/347 |
| 5,889,602 | A | * | 3/1999  | Johnson et al. .......... 359/154 |
| 5,896,575 | A | * | 4/1999  | Higginbotham et al. .... 455/566 |
| 6,028,764 | A | * | 2/2000  | Richardson et al. ....... 361/681 |
| 6,072,465 | A | * | 6/2000  | Maeda et al. ............. 345/156 |
| 6,131,130 | A | * | 10/2000 | Van Ryzin ................. 710/6 |

* cited by examiner

Primary Examiner—Lun-yi Lao (57) ABSTRACT

A portable computer system includes one or more battery connectors, a portable base computer, and a portable user interface module. The base computer includes a wireless receiver, and a processor having a data input operatively connected to the receiver and a power input operatively connected to at least one of the connectors. The base computer also includes mass storage operatively connected to the processor, and a wireless transmitter operatively connected to the processor. The user interface module includes a wireless receiver and a two-dimensional display having a data input operatively connected to the receiver and a power input operatively connected to at least one of the connectors. The user interface device further includes a user interface device and a wireless transmitter operatively connected to the user interface device.

55 Claims, 3 Drawing Sheets

PORTABLE COMPUTER SYSTEM

FIELD OF THE INVENTION

This invention relates to portable computers, including portable computers that have a user interface module that communicates with a base computer over a wireless channel.

BACKGROUND OF THE INVENTION

Portable computers are available with a wide variety of feature sets. Larger models, often called notebooks or laptops, generally have a full-size display screen, a keyboard with full-size alpha-numeric keys, a mass storage medium such as a hard drive, removable storage media such as a CD-ROM drive and a floppy drive, and standard parallel and serial ports. Smaller models, sometimes called sub-notebooks, are generally more portable, but at the expense of some of their features. For example, one or more of the storage media can be omitted, the screen and keyboard can be made more compact, and ports can be omitted or simplified. The smallest machines, often called palm-tops or personal digital assistants (PDAs), fit in ordinary jacket pockets, but typically have quite limited displays, keyboards, storage, and ports.

Each of these types of machines provides a different trade-off between portability and features, and is therefore best suited to certain tasks. While smaller machines are easier to carry, they can be tedious to use to type long documents, and their processing and storage capabilities may be insufficient for some applications. Conversely, larger machines are more comfortable to use and exhibit more powerful capabilities, but their size and weight makes them cumbersome to transport.

SUMMARY OF THE INVENTION

In one general aspect, the invention features a portable computer system that includes one or more battery connectors, a portable base computer, and a portable user interface module. The base computer includes a wireless receiver, and a processor having a data input operatively connected to the receiver and a power input operatively connected to at least one of the connectors. The base computer also includes mass storage operatively connected to the processor, and a wireless transmitter operatively connected to the processor.

The user interface module includes a wireless receiver and a two-dimensional display having a data input operatively connected to the receiver and a power input operatively connected to at least one of the connectors. The portable user interface device also includes a user interface device and a wireless transmitter operatively connected to the user interface device.

The computer system can further include a mechanical connector operative to hold the base computer in contact with the user interface module, and/or an electrical connector operative to electrically connect the base computer to the user interface module. The electrical connector can include bypass contacts operative to bypass the wireless transmitters and receivers of the base computer and user interface module. The base computer can include a display primitive generator operatively connected between the processor and the wireless transmitter of the base computer, with the display primitive generator being operative to send display primitives to the user interface module that are capable of displaying a pointing-device-driven, general-purpose, window-based operating system screen on the display of the user interface module. The computer system can further include at least a portion of a local area network operatively connected between the processor and the display, with the base computer system being operative to communicate with the user interface module using packet traffic on the local area network. The display can have a resolution of at least 640×480 pixels, the user interface device can include a pointing device, and/or the user interface device can include a keyboard that comprises separate keys for all of the letters of the alphabet and the ten decimal digits. The portable base computer can include a rectangular housing for supporting its processor, mass storage, receiver and transmitter, with the user interface module further including a rectangular housing for supporting its display device, user interface device, receiver and transmitter, and with one of the two largest faces of the housing of the base computer being of substantially the same size and shape as one of the two largest faces of the housing of the user interface module. The portable base computer system can include one of the battery connectors that is operatively connected to the processor and the user interface module can include one of the battery connectors operatively connected to the display. The wireless transmitters and receivers can be obstacle-tolerant.

In another general aspect, the invention features a portable base computer system for use with a mobile user interface module that includes a two-dimensional display, a wireless receiver, a wireless transmitter, and a housing. The portable base computer includes a wireless receiver constructed and adapted to communicate with the wireless transmitter of the user interface module, a processor responsive to commands received from the wireless receiver and including a power input responsive to a battery contact, mass storage operatively connected to the processor, a wireless transmitter responsive to the processor and constructed and adapted to communicate with the wireless receiver of the user interface module, and a housing for holding the processor, the memory, the storage, the receiver, and the transmitter.

The base computer system can further include at least one mechanical docking connector mounted relative to the housing and operative to hold the base computer in contact with the user interface module and/or at least one electrical docking connector mounted relative to the housing and operative to electrically connect the base computer system to the user interface module. The electrical connector can include bypass contacts operative to bypass the wireless transmitters and receivers. The base computer system can include a display primitive generator to which the wireless transmitter of the base computer system is responsive to send the display primitives to the user interface module, with the display primitive generator being operative to send display primitives that are capable of displaying a pointing-device-driven, general-purpose, window-based operating system screen on the display. At least a portion of a local area network can be operatively connected between the processor and the display, and the base computer system can be operative to communicate with the user interface module using packet traffic on the local area network. The base computer system further includes a rectangular housing for supporting its processor, mass storage, receiver and transmitter, with one of the two largest faces of the housing being of substantially the same size and shape as one of two largest faces of a housing of the user interface module.

In a further general aspect, the invention features a user interface module for use with a portable base computer system that includes a processor, mass storage, an obstacle-tolerant wireless transmitter, an obstacle-tolerant wireless receiver, and a housing bearing at least one docking connector. The user interface module includes an obstacle-tolerant wireless receiver constructed and adapted to communicate with the wireless transmitter of the portable base computer system, a two-dimensional display responsive to the wireless receiver, a user interface device, an obstacle-tolerant wireless transmitter that is responsive to the user interface device and is constructed and adapted to communicate with the wireless receiver of the portable base computer system, and at least one docking connector constructed and adapted to mate with directly to the connector of the computer system.

The docking connector can be a mechanical connector operative to hold the base computer system in contact with the user interface module. The docking connector can be an electrical connector operative to electrically connect the computer system to the user interface module. The electrical connector can include bypass contacts operative to bypass the wireless transmitters and receivers. The display can have a resolution of at least 640×480 pixels. The user interface device can comprise a keyboard that includes separate keys for all of the letters of the alphabet and the ten decimal digits. The user interface device can include a pointing device. The user interface module can include a display primitive decoder responsive to display primitives received from the base computer system to display a pointing-device-driven, general-purpose, window-based operating system screen on the display. The user interface module can include a rectangular housing for supporting its display device, user interface device, receiver and transmitter, with one of the two largest faces of the housing of the user interface module being of substantially the same size and shape as one of two largest faces of a housing of the portable base computer system.

In another general aspect, the invention features a portable computer system that includes portable means for processing application programs at a first location in response to user interface signals, the means for processing being readily transportable in hand luggage, first wireless communication means for transmitting results from the portable means for processing and for relaying received user interface signals to the portable means for processing, second wireless communication means for receiving the results from the first communication means and for transmitting the user interface signals to the first wireless communication means, and portable user interface means responsive to the results received by the second wireless communication means to display graphical user interface constructs on a two-dimensional screen.

The portable means for processing, the first and second wireless communication means, and the portable user interface can together weigh under about nine pounds, and/or together fit within a space of less than about two inches thick by about nine inches by about twelve inches. The portable computer system can include means for together transporting the portable means for processing, the first and second wireless communication means, and the portable user interface in a mechanically and electrically docked state. The portable computer system can further include means for housing the portable means for processing, can further include means for housing the user interface means, with one of the two largest faces of the means for housing the portable means for processing being of substantially the same size and shape as one of the two largest faces of the means for housing the user interface means. The portable computer can include means in the portable means for processing to generate display primitives and send them to the user interface means via the first and second communication means.

In a further general aspect, the invention features a computing method that includes the steps of processing application programs in a base computer system at a first location, communicating results from the application programs by a wireless communication method to a user interface module remote from the base computer system, displaying results of the step of communicating on a screen of the user interface module, together transporting the base computer system and the user interface module to a second location, processing application programs in the base station at the second location, again communicating results from the application programs to the user interface module, and displaying results of the step of again communicating on a screen of the user interface module.

The step of together transporting can transport the base station and the user interface module in a mechanically and electrically docked state, and the step of communicating results can communicate display primitives.

Systems according to the invention are advantageous in that they can permit a user to reap the benefits of both larger and smaller portable systems. When a user needs an easily transportable computer, he or she can take just the user interface module. If he or she anticipates needing more features, he or she can take both the user interface and base system.

Such systems are particularly advantageous in an office environment. By bringing just the portable user interface to a meeting, the user can have access to electronic mail, network communications, and centrally stored files, without having to carry a heavy machine around the office. On a longer trip, where communications may be unreliable, or where sharing of a removable medium is important, the user can bring both the user interface and its base station.

Using the user interface alone may also be safer in certain circumstances. If passwords or encryption are provided between the user interface and base station, theft of the user interface device may represent a minimal security problem. And because no storage need be provided on the user interface device, theft of the machine will not result in loss of data. In more rugged environments, separating the user interface from its base computer can also prevent damage of the more delicate drive mechanisms.

DETAILED DESCRIPTION OF AN ILLUSTRATIVE EMBODIMENT

Figure 1:
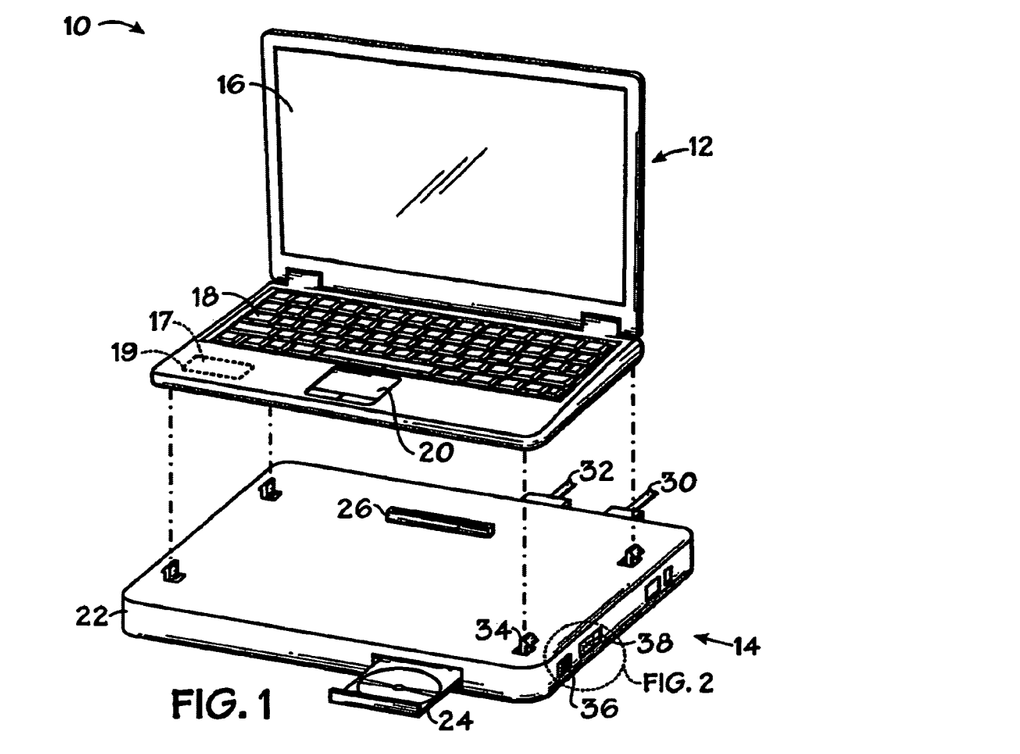
FIG. 1 is a perspective drawing of a computer system according to the invention separated into its two parts.

Referring to FIG. 1, a portable computer system 10 includes a user interface module 12 and a base computer 14. The user interface module includes a display 16, a keyboard 18 that can have substantially full-size alpha-numeric keys, and a pointing device 20. The base computer can include one or more fixed storage media 22, such as hard drives, and one or more removable storage media 24, such as CD-ROM drives or a floppy disk drives. The base computer also includes a connector for a power cord 30, and ports for one or more data communication connectors 32. These ports can include parallel ports, external keyboard and mouse ports, serial ports, sound ports, and video ports. The base computer can also include a docking connector 26 that mates with a corresponding connector on the user interface module.

The user interface module 12 is housed in a clam-shell case made up of a display housing hinged with respect to a keyboard housing. The base computer 14 has a shallow, rectangular housing whose outline matches the keyboard side of the clam-shell case. The base computer should be relatively thin, so that when the user interface module is docked to it, the complete computer system 10 is also relatively thin. To this end, drives in the base computer can be placed side-by-side, with the bulk of the base computer's processor circuitry also being placed on the same level as the drives.

Figure 2:
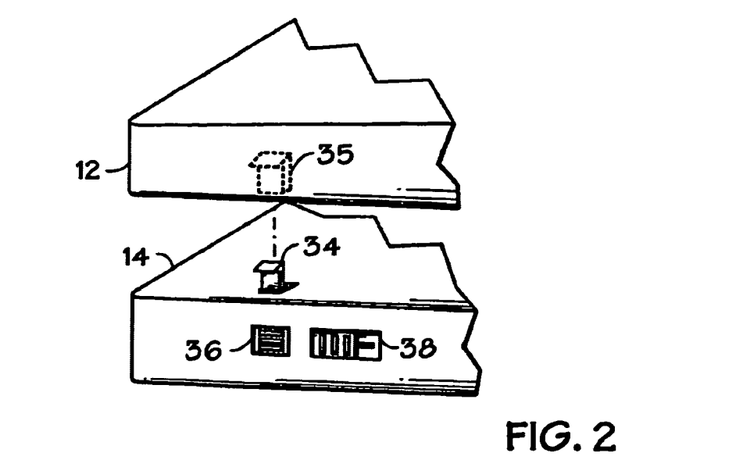
FIG. 2 is a close-up perspective drawing of a docking latch for the system of FIG. 1.

The computer system 10 includes a latching mechanism to latch the user interface module 12 to the base computer 14. The latching mechanism can be structured in a number of different ways. In one embodiment, it can be made up of four latches that each include a spring-mounted, barbed tongue 34 that interacts with one of four corresponding cavities 35 in the user interface module. Each tongue is located proximate one of four release buttons 36, which together allow a user to release the user interface module from the base computer. To avoid accidental release of the user interface module from the base system, some or all of the latching mechanisms can include a safety interlock which can include a spring-loaded sliding button 38 connected to a bolt that blocks the release button. The latching mechanism can of course be implemented in a variety of other ways, such as with a pair of rear pivots and a pair of front latches. Other latching mechanisms could include interlocking channels, straps, hook-and-loop fasteners, or solenoids controlled by the processor. A safety interlock is often preferable, either mechanical or electromechanical, especially if the system is equipped with only one or two release actuators.

Figure 3:
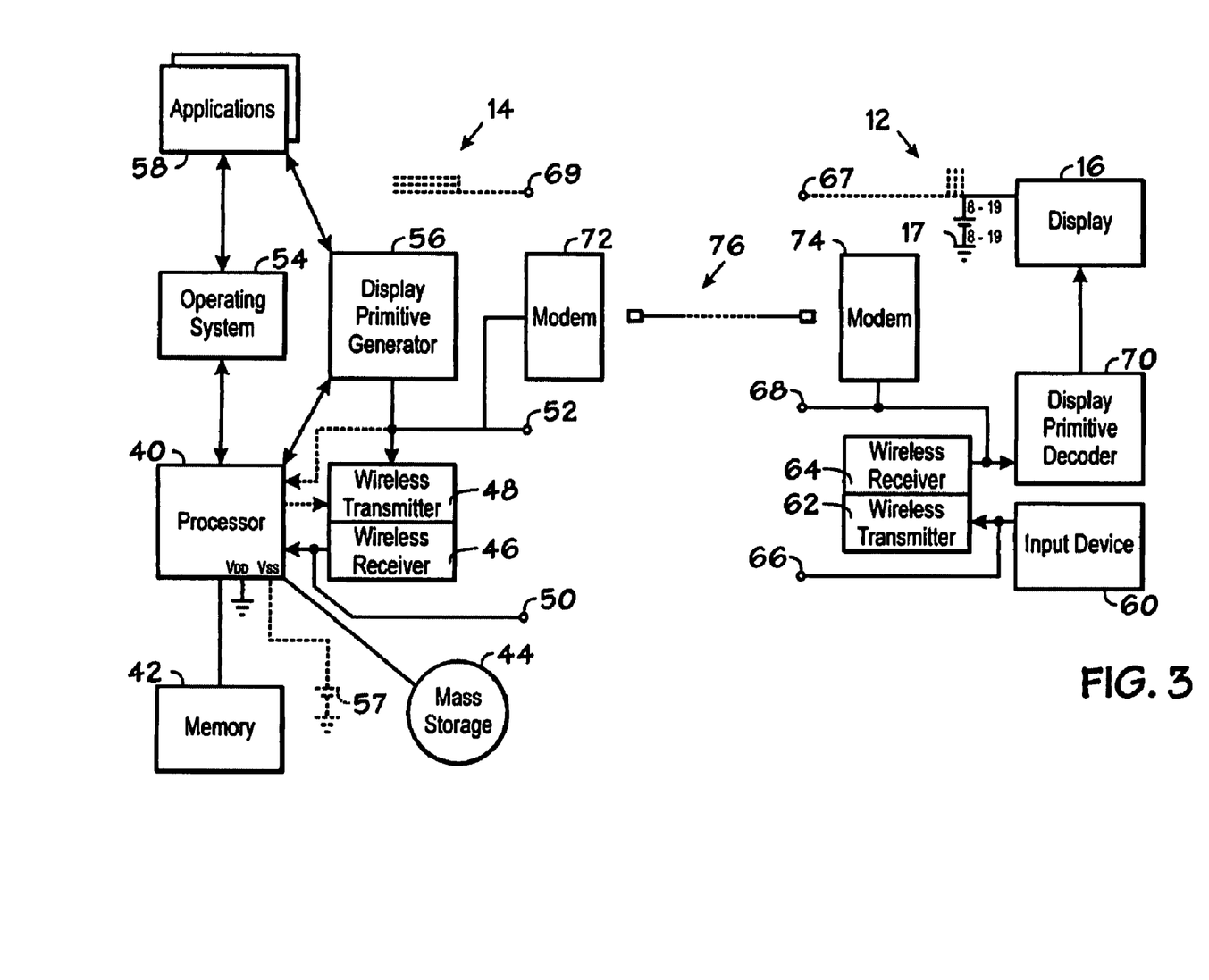
FIG. 3 is a block diagram of the computer system of FIG. 1.

Referring to FIGS. 1 and 3, the base computer 14 includes a processor 40 that is operatively connected to a memory device 42, such as a semiconductor memory bank. The processor is also operatively connected to mass storage 44, such a hard drive. A wireless receiver 46 has an output operatively connected to an input of the processor, and a wireless transmitter 48 has an input operatively connected to an output of the processor. The wireless transmitters and receivers can be obstacle-tolerant transmitters and receivers, which can communicate even if obstacles such as walls exist in the path separating them. Radio-frequency communication is one simple type of obstacle-tolerant communication.

A bypass receive connector 50 and a bypass transmit connector 52 can be operatively connected to the processor or other portions of the base computer system so as to respectively bypass the receiver and the transmitter. These bypass connectors can form part of the docking connector 26. The docking connector can be a metal-to-metal connector or it can be another type of coupler for short range line-of-sight connections, such as an electro-optic coupler.

The base computer 14 also includes an operating system 54 and a display primitive generator 56 that can each interact with the processor 40, receiver 46, and transmitter 48. Also provided are one or more applications 58 that typically interact with the operating system and the display primitive generator. Both the user interface module 12 and the base computer can include hardware, software, or a combination of both, and the determination of how any particular function is implemented is a decision that is made based on both technical and economic considerations. For example, the display primitive generator can be implemented as a high-speed circuit, which is connected in a path between the processor and transmitter. In systems where the processor has extra capacity, however, it may be advantageous to offload some or all of the display primitive generator's functionality into software that executes on the processor.

The user interface module 12 can have an input device 60, which can include the keyboard 18, the pointing device 20, or both. The user interface module also includes a wireless transmitter 62 and a wireless receiver 64. The wireless transmitter has an input operatively connected to an output of the input device, which is also operatively connected to a bypass connector 66 so as to bypass the wireless transmitter. The wireless receiver has an output provided to a display primitive decoder 70, which is also operatively connected to a bypass connector 68 so as to bypass the wireless receiver. As part of the overall docking system, the docking connector 26 can also include an interlock mechanism that disables the wireless transmitters and receivers when the bypass connectors are mated. The display primitive decoder has an output operatively connected to an input of the display 16.

The user interface module 12, the base computer 14, or both can also include a modem. The modem 72 in the base computer can have a serial port operatively connected to the processor and a modulated port operatively connected to a network connector, such as a public network telephone jack. The modem 74 in the user interface module can have a serial port operatively connected to an input of the display primitive decoder and a modulated port operatively connected to a network connector. In systems where both the user interface and base computer have a modem, the two parts can communicate with each other using the modems instead of the wireless transmitters and receivers. A system with a modem only in its base computer can be used by the processor to connect to other remote computers such as Internet Service Providers (ISPs). A user interface equipped with a modem can be used to connect to different base computers or to network wireless interfaces, as will be discussed below.

The architecture outlined in FIG. 2 is intended as illustrative and could be changed in a variety of ways. For example, the display primitive generator could be configured to communicate with application programs via the operating system, instead of directly as shown. Interface details have been omitted to clarify the diagram, and variety of additional subsets, supersets, and permutations of the elements shown also will conform with the intended scope of the invention.

In operation, referring to FIGS. 1–3, a user can interact with the system 10 in either a docked or an undocked mode. In the docked mode, the user interface 12 can be physically connected to the base computer 14 by the latching mechanism, and electrically connected to the base computer via the bypass connectors 50, 52, 66, 68. The wireless transmitters and receivers 46, 48, 62, 64 can be shut down in docked mode to save power and to reduce network traffic in network environments. It is also possible to connect the user interface module to the base computer on a mechanical level only, and to continue to communicate over the wireless channel.

In its docked state, the system 10 can be comparable in size and function to a full-featured laptop computer. A business user can therefore put the system in his or her briefcase, operate it on a train or plane, or use it in the other ways that he or she might use a full-featured laptop computer. Preferably, the docked system weighs under about nine pounds and measures less than about two inches thick by roughly nine inches by twelve inches.

The user can also remove the user interface module 12 from the base computer 14, and use it in its undocked mode. In this mode, the wireless transmitter 62 of the user interface module provides key strokes, pointing device positions, and other input device events to the wireless receiver 46 of the base. The wireless transmitter 48 of the base provides display primitives to the wireless receiver 64 of the user interface.

Display primitives are constructs that express graphical information that an application or the operating system generates to be displayed on the screen. These can include data elements such as compressed bit maps, menu bars, or buttons. While these constructs are encoded to reduce the required bandwidth of the wireless communication channel, their decoding does not require a substantial amount of processing power in the user interface module. The specific communication protocol employed between the wireless receivers and transmitters is optimized to reduce the amount of data sent over the wireless link, and to reduce the complexity of the display primitive decoder 70. This can reduce the cost, weight, and power consumption of the user interface module.

In undocked mode, the user can access the resources and capabilities of the base computer without being burdened with its weight. This makes the user interface module more easily transported while still allowing its user to perform processor and network-based tasks such as word processing, composing of electronic mail, and database searching. In situations where a telephone line is available, the user interface can also interact with the base computer via a modem connection. This connection can take place over the public service telephone network 76, via a satellite connection, or through other public or private communication channels.

The user interface module 12 can receive power from a first battery 17 within its housing via a pair of battery connectors 19. The base computer 14 can also receive power from a second battery 57 within its housing through a pair of battery connectors. Alternatively, a battery-free base system can derive power through a pair of power connectors 67, 69 from the battery in the user interface module when it is used in docked mode, or it can receive power from an external source when the user interface module is used in undocked mode.

Figure 4:
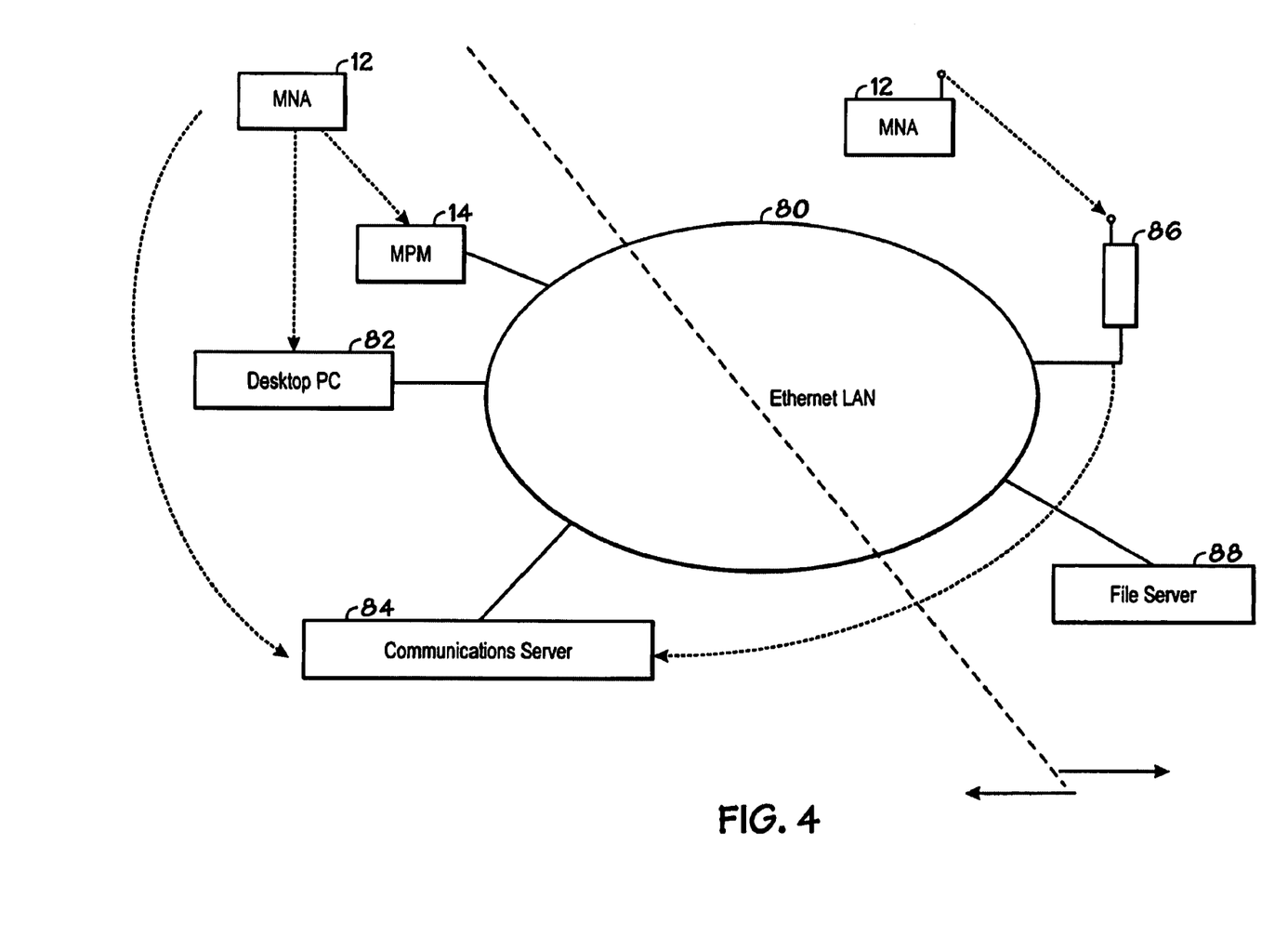
FIG. 4 is a network-level system diagram for use with computer systems according to FIG. 1.

Referring to FIG. 4, a portable computer system 10 according to the invention can also be used in a networked environment. As illustrated on the left side of FIG. 4, the user interface module 12 can be connected via dial-up modem connection to the base computer 14, which can be connected to a network, such as an Ethernet local area network 80. Alternatively, the user interface module can be connected via dial-up modem to a desktop computer 82 that is connected to the network. It is also possible for the mobile user interface module to communicate via dial-up modem connection to a remote access communication server (RAS) 84, which also resides on the network. The communication server can simultaneously service a number of user interface modules.

As shown on the right side of FIG. 4, the user interface module 12 can also communicate directly to wireless access points 86 that are connected to the local area network 80. If files are maintained on a shared file server 88, the user interface module 12 can access the same files using any of the interconnection methods.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A portable computer system, comprising:
   a portable base computer comprising:
      a first wireless receiver,
      a processor having a data input operatively connected to the first wireless receiver, and
      a first wireless transmitter operatively connected to the processor, and
   a processor-less portable user interface module being detachably coupleable to the portable base computer, the portable user interface module comprising:
      a second wireless receiver,
      a two-dimensional display having a data input operatively connected to the second wireless receiver of the portable user interface module,
      a user input device, and
      a second wireless transmitter operatively connected to the user input device.

2. The portable computer system of claim 1 comprising a mechanical connector operative to hold the base computer in contact with the processor-less user interface module.

3. The portable computer system of claim 1 comprising an electrical connector operative to electrically connect the base computer to the processor-less user interface module.

4. The portable computer system of claim 3 wherein the electrical connector comprises bypass contacts operative to bypass the wireless transmitters and receivers of the base computer and the processor-less user interface module.

5. The portable computer system of claim 1 wherein the base computer comprises a display primitive generator operatively connected between the processor and the wireless transmitter of the base computer, and wherein the display primitive generator is operative to send display primitives to the processor-less user interface module that are capable of displaying a pointing-device-driven, general-purpose, window-based operating system screen on the display of the processor-less user interface module.

6. The portable computer system of claim 1 comprising at least a portion of a local area network operatively connected between the processor and the display, and wherein the base computer system is operative to communicate with the processor-less user interface module using packet traffic on the local area network.

7. The portable computer system of claim 1 wherein the display has a resolution of at least 640×480 pixels.

8. The portable computer system of claim 1 wherein the processor-less user interface device comprises a keyboard that comprises separate keys for all of the letters of the alphabet and the ten decimal digits.

9. The portable computer system of claim 1 wherein the user input device comprises a pointing device.

10. The portable computer system of claim 1 wherein the portable base computer comprises a rectangular housing for supporting its processor, receiver and transmitter, wherein the processor-less user interface module comprises a rectangular housing for supporting its display device, user input device, receiver and transmitter, and wherein one of the two largest faces of the housing of the base computer is of substantially the same size and shape as one of the two largest faces of the housing of the processor-less user interface module.

11. The portable computer system of claim 1 wherein the portable base computer system comprises at least one battery connector that is operatively connected to the processor and wherein the processor-less user interface module includes at least one battery connector operatively connected to the display.

12. The portable computer system of claim 1 wherein the wireless transmitters are obstacle-tolerant transmitters and the wireless receivers are obstacle-tolerant receivers.

13. The portable computer system of claim 1 wherein the portable base computer comprises:
one or more battery connectors,
a power input operative connected to at least one of the battery connectors, and
a mass storage operatively connected to the processor.

14. A portable base computer system for use with a mobile user interface module that comprises a two-dimensional display, a first wireless receiver, a first wireless transmitter, a user input device, and a housing, the portable base computer comprising:
a second wireless receiver constructed and adapted to communicate with the first wireless transmitter of the user interface module,
a processor responsive to commands received from the second wireless receiver, the processor configured to execute an application program and generate results therefrom,
a second wireless transmitter responsive to the processor and constructed and adapted to communicate with the wireless receiver of the user interface module, and
a housing for holding the processor, the second wireless receiver, and the second wireless transmitter,
wherein the portable base computer system does not comprise a display device operatively connected to the processor to display graphical information based on the results generated by the processor.

15. The portable base computer system of claim 14 comprising at least one mechanical docking connector mounted relative to the housing and operative to hold the base computer in contact with the user interface module.

16. The portable base computer system of claim 14 comprising at least one electrical docking connector mounted relative to the housing and operative to electrically connect the portable base computer system to the user interface module.

17. The portable base computer system of claim 17 wherein the electrical connector comprises bypass contacts operative to bypass the wireless transmitters and receivers of the portable base computer system and user interface module.

18. The portable base computer system of claim 14 wherein the portable base computer system comprises a display primitive generator to which the wireless transmitter of the base computer system is responsive to send display primitives to the user interface module, and wherein the display primitive generator is operative to send display primitives to display the graphical information on the display of the user interface module.

19. The portable base computer system of claim 18, wherein the graphical information comprises a point-device-driven, general-purpose, window-based operating system.

20. The portable bases computer system of claim 14 comprising at least a portion of a local area network operatively connected between the processor and the display, and wherein the portable base computer system is operative to communicate with the user interface module using packet traffic on the local area network.

21. The computer system of claim 14 comprising:
one or more battery connectors,
a power input operatively connected to at least one of the battery connectors, and
a mass storage operatively connected to the processor.

22. The portable bases computer system of claim 21 wherein the portable base computer system comprises a rectangular housing for supporting its processor, receiver and transmitter, and wherein one of the two largest faces of the housing of the portable base computer system is of substantially the same size and shape as one of two largest faces of a housing of the user interface module.

23. The portable base computer of claim 14 wherein the wireless transmitters are obstacle-tolerant transmitters, and the wireless receivers are obstacle-tolerant receivers.

24. A user interface module for use with a portable base computer system that comprises a processor to execute an application program, an obstacle-tolerant wireless transmitter, an obstacle-tolerant wireless receiver, and a housing bearing at least one docking connector, the user interface module comprising:
an obstacle-tolerant wireless receiver constructed and adapted to communicate with the wireless transmitter of the portable base computer system,
a two-dimensional display responsive to the wireless receiver,
a user input device,
an obstacle-tolerant wireless transmitter responsive to the user input device, and being constructed and adapted to communicate with the wireless receiver to the portable base computer system, and
at least one docking connector constructed and adapted to mate directly to the connector of the portable base computer system,
wherein the user interface module does not comprise a processor to execute an application program.

25. The user interface module of claim 24 wherein the docking connector is a mechanical connector operative to hold the portable base computer system in contact with the user interface module.

26. The user interface module of claim 24 wherein the docking connector is an electrical connector operative to electrically connect the portable base computer system to the user interface module.

27. The user interface module of claim 26 wherein the electrical connector includes bypass contacts operative to bypass the wireless transmitters and receivers of the portable base computer system and user interface module.

28. The user interface module of claim 24 wherein the display has a resolution of at least 640×480 pixels.

29. The user interface module of claim 24 wherein the user interface device comprises a keyboard that includes separate keys for all of the letters of the alphabet and the ten decimal digits.

30. The user interface module of claim 24 wherein the user interface device comprises a pointing device.

31. The user interface module of claim 24 wherein the user interface module comprises a display primitive decoder responsive to display primitives received solely from the base computer system on the display.

32. The user interface module of claim 31, wherein the display primitive decoder is response to display primitives received solely from the base computer system to display a point-device-driven, general-purpose, window-based operation system screen on the display.

33. The user interface module of claim 24 wherein the user interface module comprises a rectangular housing for supporting its display device, user input device, receiver and transmitter, and wherein one of the two largest faces of the housing of the user interface module is of substantially the same size and shape as one of two largest faces of a housing of the portable base computer system.

34. A portable computer system, comprising:
portable means for processing application programs at a first location in response to user interface signals, the means for processing being readily transportable in hand luggage,
first wireless communication means for transmitting results from the portable means for processing, and the first wireless communications means for relaying received user interface signals to the portable means for processing,
second wireless communication means for receiving the results from the first communication means and for transmitting the user interface signals to the first wireless communication means, and
portable user interface means responsive to the results received by the second wireless communication means to display graphical user interface constructs on a two-dimensional screen, wherein the portable user interface means comprises a first user input device to generate user interface signals, and wherein the portable means for processing does not comprise a second user input device to generate user interface signals.

35. The portable computer system of claim 34 wherein the portable means for processing, the first and second wireless communication means, and the portable user interface together weigh under about nine pounds.

36. The portable computer system of claim 35 wherein the portable means for processing, the first and second wireless communication means, and the portable user interface together fit within a space of less than about two inches thick by about nine inches by about twelve inches.

37. The portable computer system of claim 34 comprising means for together transporting the portable means of processing, the first and second wireless communication means, and the portable user interface in a mechanically and electrically docked state.

38. The portable computer system of claim 34 comprising means for housing the portable means for processing, comprising means for housing the user interface means, and wherein one of the two largest faces of the means for housing the portable means for processing is of substantially the same size and shape as one of the two largest faces of the means for housing the user interface means.

39. The portable computer system of claim 34 comprising means included in the portable means for processing to generate display primitives and send the display primitives to the user interface means via the first and second communication means.

40. A computing method, comprising the steps of:
processing application programs in a base computer system at a first location,
communicating results from the application programs by a wireless communication method to a user interface module comprising a portable user input device, the user interface module being disposed remote from the base computer system,
displaying results of the step of communication on a screen of the user interface module,
together transporting the base computer system and the user interface module to a second location,
processing application programs in the base station at the second location,
again communicating results from the application programs to the user interface module, and
displaying results of the step of again communicating on a screen of the user interface module,
wherein, at both the first location and the second location, the steps of processing application programs in the base station are performed in response only to user input signals generated via the portable user input device.

41. The computing method of claim 40 wherein the step of together transporting transports the base station and the user interface module in a mechanically and electrically docked state.

42. The computing method of claim 40 wherein the step of communicating results communicates display primitives.

43. A portable computer system, comprising:
a base unit;
a portable user interface module detachably coupleable to the base unit, the portable user interface module comprising a user input device and a display device; and
only one processor responsive to user input signals input from the user input device,
wherein the only one processor is disposed within the base unit and is configured to respond to the user input signals input from the user input device regardless of whether the base unit is coupled to the portable user interface module or is detached from the portable user interface module.

44. The portable computer system as recited in claim 43, wherein the user input device is the only user input device.

45. The portable computer system as recited in claim 43, wherein the display device is the only display device, wherein the processor is configured to execute program code and produce results therefrom, and wherein the display device is configured to display visible indicia corresponding to the results regardless of whether the base unit is coupled to the portable user interface module or is detached from the portable user interface module.

46. The computer system as recited in claim 43, wherein the base unit comprises a first wireless receiver operatively coupled to the processor and a first wireless transmitter operatively coupled to the processor, and wherein the portable user interface module comprises a second wireless receiver operatively coupled to the display device and a second wireless transmitter operatively coupled to the user input device.

47. A portable computer system, comprising:
a base unit comprising a processor to execute an application program and to produce results therefrom;
only one display device to display visible indicia based on the results produced by the processor; and
a portable user interface module detachably coupleable to the base unit, the portable user interface module comprising the only one display device,
wherein the only one display device displays the visible indicia regardless of whether the base unit is coupled to the portable user interface module or is detached from the portable user interface module.

48. The portable computer system as recited in claim 47, wherein the portable user interface module comprises a user input device.

49. The portable computer system as recited in claim 48, wherein the user input device is the only user input device, and wherein the processor is configured to respond only to user input signals input via the only user input device regardless of whether the base unit is coupled to the portable user interface module or is detached from the portable user interface module.

50. The portable computer system as recited in claim 47, wherein the display device is the only display device, wherein the processor is configured to execute program code and produce results therefrom, and wherein the display device is configured to display visible indicia corresponding to the results regardless of whether the base unit is coupled to the portable user interface module or is detached from the portable user interface module.

51. The computer system as recited in claim 47, wherein the base unit comprises a first wireless receiver operatively coupled to the processor and a first wireless transmitter operatively coupled to the processor, and wherein the portable user interface module comprises a second wireless receiver operatively coupled to the display device and a second wireless transmitter operatively coupled to the user input device.

52. A portable computer system, comprising:
only one user input device;
a base unit comprising a processor responsive to user input signals from the only one user input device; and
a portable user interface module detachably coupleable to the base unit, the portable user interface module comprising a display and the user input device,
wherein the processor is responsive only to user input signals that are input from the only one user input device regardless of whether the base unit is coupled to the portable user interface module or is detached from the portable user interface module.

53. The portable computer system as recited in claim 52, wherein the display device is the only display device, wherein the processor is configured to execute program code and produce results therefrom, and wherein the display device is configured to display visible indicia corresponding to the results regardless of whether the base unit is coupled to the portable user interface module or is detached from the portable user interface module.

54. The portable computer system as recited in claim 52, wherein the processor is the only processor.

55. The computer system as recited in claim 52, wherein the base unit comprises a first wireless receiver operatively coupled to the processor and a first wireless transmitter operatively coupled to the processor, and wherein the portable user interface module comprises a second wireless receiver operatively coupled to the display device and a second wireless transmitter operatively coupled to the user input device.

* * * * *

UNITED STATES PATENT AND TRADEMARK OFFICE
CERTIFICATE OF CORRECTION

| | | |
|---|---|---|
| PATENT NO. | : 6,982,702 B1 | |
| APPLICATION NO. | : 09/096684 | |
| DATED | : January 3, 2006 | |
| INVENTOR(S) | : Robert C. Frame | |

It is certified that error appears in the above-identified patent and that said Letters Patent is hereby corrected as shown below:

In column 8, line 21, in Claim 1, after "a" delete "processor-less".

In column 8, line 22, in Claim 1, after "computer," insert -- wherein the portable user interface does not comprise a central processing unit (CPU) operable to execute an application program and to produce results therefrom, --.

In column 8, line 33, in Claim 2, after "the" delete "processor-less".

In column 8, line 36, in Claim 3, after "the" delete "processor-less".

In column 8, line 40, in Claim 4, after "the" delete "processor-less".

In column 8, line 46, in Claim 5, after "the" delete "processor-less".

In column 8, line 49, in Claim 5, after "the" delete "processor-less".

In column 8, line 54, in Claim 6, before "user" delete "processor-less".

In column 8, line 59, in Claim 8, before "user" delete "processor-less".

In column 8, line 67, in Claim 10, before "user" delete "processor-less".

In column 9, line 5, in Claim 10, before "user" delete "processor-less".

In column 9, line 10, in Claim 11, before "user" delete "processor-less".

In column 9, line 19, in Claim 13, delete "operative" and insert -- operatively --, therefor.

UNITED STATES PATENT AND TRADEMARK OFFICE
CERTIFICATE OF CORRECTION

PATENT NO. : 6,982,702 B1
APPLICATION NO. : 09/096684
DATED : January 3, 2006
INVENTOR(S) : Robert C. Frame It is certified that error appears in the above-identified patent and that said Letters Patent is hereby corrected as shown below:

In column 9, line 52, in Claim 17, delete "claim 17" and insert -- claim 16 --, therefor.

In column 10, line 1, in Claim 20, delete "bases" and insert -- base --, therefor.

In column 10, line 12, in Claim 22, delete "bases" and insert -- base --, therefor.

Signed and Sealed this

Twenty-first Day of July, 2009

JOHN DOLL
*Acting Director of the United States Patent and Trademark Office*